Patented Dec. 7, 1926.

1,609,848

UNITED STATES PATENT OFFICE.

KENTON F. VICKERY, OF DAVENPORT, IOWA, ASSIGNOR, BY MESNE ASSIGNMENTS, TO GOLD DUST CORPORATION, OF NEW YORK, N. Y., A CORPORATION OF NEW JERSEY.

LIQUID CLEANING COMPOUND.

No Drawing. Application filed September 27, 1924. Serial No. 740,201.

My invention has reference to a liquid cleaning compound, and relates more specially to a cleaner for glass surfaces, such as windows, wind-shields and the like. Various ingredients have been used with water as a solvent and carrier, one of the most efficient of these being tri-sodium phosphate. One objection to the use of this chemical resides in the fact that the trade preparation is liable to contain a considerable amount of foreign matter, the reaction between the chemical and water causing the foreign matter to be distributed throughout the mixture. When the liquid is used these impurities form a film or fog upon the surface of the glass, which is especially noticeable when the bright sun is shining on the glass. The same effect is produced in case the water which is used as a solvent is not entirely pure, even if no impurities are to be found in the chemical, or it may result from foreign matter in both the chemical and water. The purpose of the present invention is to produce a compound in which the tri-sodium phosphate is one of the ingredients, and which compound contains other chemicals which will operate to dissolve the impurities, and permit the same to be filtered out of the preparation before it is used.

The composition comprises a mixture of tri-sodium phosphate, water, and phosphoric acid. In the preparation of the mixture the tri-sodium phosphate ($Na_3PO_4$—$12H_2O$,) is first placed in the water, in the proportions of about twenty grains of the tri-sodium phosphate to each gallon of water. This mixture is then subjected to a heat of about 99 degrees centigrade, and maintained at this temperature for about twenty minutes to drive off all gases and destroy all living organisms. If the water is hard an additional five grains of tri-sodium phosphate is added for each degree of hardness of the water, i. e. for each part per 100,000 of equivalent calcium carbonate present in the water before heating the mixture. After the mixture has been heated for the time mentioned ten grains of the phosphoric acid, (85° U. S. P.) is added, and a like temperature maintained for several minutes longer. This insures a thorough distribution of the acid, and consequent beneficial action thereof upon the impurities in the mixture. In case hard water is used an additional two and one-half grains of phosphoric acid is added for each gallon of water. After the final heating operation the undissolved solids are filtered out, and the clear liquid run into suitable containers.

Other acids might be substituted for the phosphoric acid, but this acid is preferred on account of the fact that it has no odor, is non-poisonous in dilute solutions, and will have no injurious effect upon metal parts with which it may come in contact.

The acid is not only used for the purpose of aiding in freeing the mixture from impurities, but it has additional cleaning properties of its own, when the compound is applied to the glass.

What I claim, and desire to secure by Letters Patent, is:

A compound for cleaning glass consisting of a mixture of tri-sodium phosphate, water, and phosphoric acid, in the proportions of twenty grains of tri-sodium phosphate and ten grains of phosphoric acid to each gallon of water.

In testimony whereof I affix my signature.

KENTON F. VICKERY.